(12) United States Patent
McBride et al.

(10) Patent No.: US 9,874,470 B2
(45) Date of Patent: *Jan. 23, 2018

(54) FUEL TANK LEVEL MONITORING SYSTEM

(71) Applicant: Tank Vision Inc., Vineyard Haven, MA (US)

(72) Inventors: Brian McBride, West Tisbury, MA (US); James E. McMann, Vineyard Haven, MA (US); Steven Cratus Owens, Litchfield, NH (US); Michael Varanka, Amherst, NH (US)

(73) Assignee: Tank Vision, Inc., Vineyard Haven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/405,168

(22) Filed: Jan. 12, 2017

(65) Prior Publication Data
US 2017/0200361 A1    Jul. 13, 2017

Related U.S. Application Data

(60) Provisional application No. 62/277,844, filed on Jan. 12, 2016.

(51) Int. Cl.
| | |
|---|---|
| *G08B 21/18* | (2006.01) |
| *G01F 23/22* | (2006.01) |
| *G01F 23/24* | (2006.01) |
| *G01F 23/296* | (2006.01) |
| *G08C 17/02* | (2006.01) |

(Continued)

(52) U.S. Cl.
CPC ............. *G01F 23/22* (2013.01); *G01F 23/24* (2013.01); *G01F 23/266* (2013.01); *G01F 23/296* (2013.01); *G08B 21/182* (2013.01); *G08C 17/02* (2013.01); *H04Q 9/00* (2013.01); *G08C 2200/00* (2013.01); *H04L 67/12* (2013.01); *H04Q 2209/823* (2013.01)

(58) Field of Classification Search
CPC ........ G01F 23/22; G01F 23/24; G01F 23/266; G01F 23/296; G08B 21/00; G08B 21/182; G08C 17/02; G08C 2200/00; H04L 67/12
See application file for complete search history.

(56) References Cited

U.S. PATENT DOCUMENTS 7,304,588 B2 *  12/2007  Ingalsbe .............. G06Q 10/087
                                                340/870.07
8,909,494 B2     12/2014  Lorden et al.
(Continued)

*Primary Examiner* — Brent Swarthout
(74) *Attorney, Agent, or Firm* — Wolf, Greenfield & Sacks, P.C.

(57) ABSTRACT

Described herein are embodiments of a system for monitoring and detecting a level of a tank storing a material. The system may be used in making a determination of whether and/or when to provide additional material to the tank, to refill the tank partially or entirely. In some embodiments, the tank may be disposed at a premises such as a residence or commercial building and the system may be disposed in part at that premises to monitor the level of the material in the tank. In some embodiments, the material may be a fuel and the tank may be a fuel tank, to provide fuel to utilities equipment at the premises. In other embodiments, the tank may include other materials, such as other utilities materials. In some embodiments, the utilities material may be potable water.

15 Claims, 7 Drawing Sheets

(51) Int. Cl.
    *G01F 23/26* (2006.01)
    *H04Q 9/00* (2006.01)
    *H04L 29/08* (2006.01)

(56) References Cited

U.S. PATENT DOCUMENTS

| | | | |
|---|---|---|---|
| 2006/0015543 A1* | 1/2006 | Humphrey | G01F 15/061 |
| 2009/0243863 A1* | 10/2009 | Lease | G01F 23/0076 |
| | | | 340/618 |
| 2017/0109722 A1* | 4/2017 | Morris | G06Q 50/06 |
| 2017/0200362 A1* | 7/2017 | McBride | G08B 21/182 |

* cited by examiner

FUEL TANK LEVEL MONITORING SYSTEM

CROSS-REFERENCE TO RELATED APPLICATIONS

This application claims priority under 35 U.S.C. §119(e) to U.S. Provisional Application Ser. No. 62/277,844, titled "Fuel tank level monitoring system," filed on Jan. 12, 2016, the entirety of which is incorporated herein by reference.

BACKGROUND

Premises, including residential or commercial premises, may in some cases have utilities material piped to the premises from outside the premises, such as piped fuel or potable water. In other cases, the premises may include tanks to store the utilities material, such as a fuel tank or a potable water tank, or tank holding another material.

SUMMARY

In one embodiment, there is provided a system comprising a fuel tank monitor. The fuel tank monitor comprises at least one circuit to determine a value indicative of a level of fuel in a fuel tank at a premises, at least one first wireless communication circuit, at least one first processor, and at least one first storage medium encoded with first executable instructions that, when executed by the at least one first processor, cause the at least one first processor to perform a first method. The first method comprises operating the at least one circuit to determine the value indicative of the level of fuel in the fuel tank, and operating the at least one first wireless communication circuit to wirelessly transmit the value indicative of the level of fuel in the fuel tank. The system further comprises a computing device disposed within a vehicle and comprising at least one second wireless communication circuit, at least one second processor, and at least one second storage medium encoded with second executable instructions that, when executed by the at least one second processor, cause the at least one second processor to perform a second method. The second method comprises, when the vehicle is proximate to the premises, operating the second wireless communication circuit to receive the identifier and the value indicative of the level of fuel, determining, while proximate to the premises, whether a condition is met for fuel to be provided to the fuel tank, and outputting, based on a result of the determining and via a user interface, an instruction to a user disposed in the vehicle of whether fuel is to be provided to the fuel tank.

In another embodiment, there is provided a vehicle comprising a fuel reservoir and at least one computing device disposed within the vehicle and comprising at least one processor and at least one storage medium having encoded thereon executable instructions that, when executed by the at least one processor, cause the at least one processor to carry out a method. The method comprises, when in proximity to a premises, receiving fuel tank level information indicative of a current level of fuel in a fuel tank at the premises, and, based on an evaluation of the fuel tank level information for the premises, outputting to an operator of the vehicle an instruction of whether to stop the vehicle at the premises and deliver fuel from the fuel reservoir to the premises fuel tank.

In a further embodiment, there is provided a method of operating a system for monitoring fuel level of a premises fuel tank and determining whether to provide fuel to the fuel tank of the premises. The method comprises, when a computing device disposed within a vehicle comprising a fuel reservoir is disposed proximate to the premises, with the computing device, receiving a wireless transmission, transmitted using a short-range wireless communication protocol, from the premises including a value indicative of a fuel level of the fuel tank of the premises, evaluating the value indicative of the fuel level to determine whether a condition for refueling is met, and, in response to determining that the condition for refueling is met, outputting an instruction to an operator of the vehicle to provide fuel from the fuel reservoir of the vehicle to the premises fuel tank.

In another embodiment, there is provided At least one computer-readable storage medium having encoded thereon executable instructions that, when executed by at least one processor, cause the at least one processor to carry out a method of operating a system for monitoring fuel level of a premises fuel tank and determining whether to provide fuel to the fuel tank of the premises. The method comprises, when a computing device disposed within a vehicle comprising a fuel reservoir is disposed proximate to the premises, with the computing device, receiving a wireless transmission, transmitted using a short-range wireless communication protocol, from the premises including a value indicative of a fuel level of the fuel tank of the premises, evaluating the value indicative of the fuel level to determine whether a condition for refueling is met, and, in response to determining that the condition for refueling is met, outputting an instruction to an operator of the vehicle to provide fuel from the fuel reservoir of the vehicle to the premises fuel tank.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
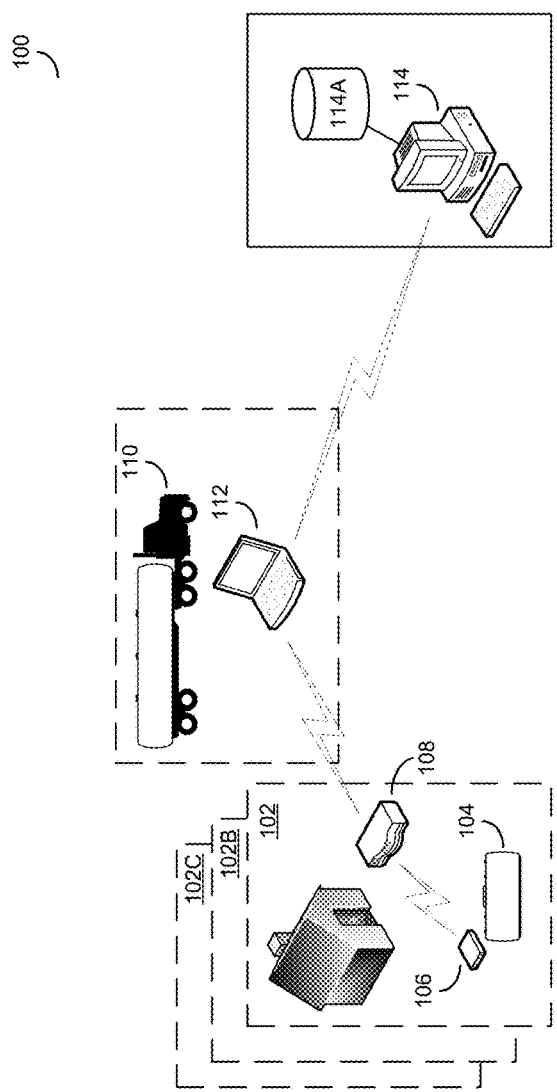
FIG. 1 is an illustration of a system with which some embodiments may operate.

Described herein are embodiments of a system for monitoring and detecting a level of a tank storing a material. The system may be used in making a determination of whether and/or when to provide additional material to the tank, to refill the tank partially or entirely.

In some embodiments, the tank may be disposed at a premises such as a residence or commercial building and the system may be disposed in part at that premises to monitor the level of the material in the tank. In some embodiments, the material may be a fuel and the tank may be a fuel tank, to provide fuel to utilities equipment at the premises. In other embodiments, the tank may include other materials, such as other utilities materials. In some embodiments, the utilities material may be potable water.

The system may additionally be disposed in part in a vehicle associated with a provider of the material, such as a fuel provider (e.g., fuel delivery company) in the case that the material is fuel. The portion of the system disposed at the premises may monitor the level of material in the tank and transmit the material level (e.g., wirelessly) from the premises for receipt by the portion of the system disposed in the vehicle when the vehicle is disposed proximate to the premises.

Upon receipt of the material level, the portion of the system disposed in the vehicle may forward the data to cloud storage or one or more remote computing devices. In some such cases, the data may be used at the remote computing devices or other devices in a scheduling process, to determine when additional material is to be provided to the tank and/or when to dispatch a vehicle to deliver additional material to the tank. Determining when to provide additional material or dispatch a vehicle may, in some embodiments, include setting or adjusting a schedule by which material is to be periodically or occasionally provided to the tank.

Additionally or alternatively, upon receipt of a value indicative of the material level at the vehicle when the vehicle is proximate to the premises, the portion of the system disposed in the vehicle may determine whether a condition is met for providing additional material to the premises, which may include communicating the material level to a remote computing device and receiving in response instructions from the remote computing device to provide additional material to the premises. If it is determined that additional material is to be provided, the system outputs an instruction to an operator of the vehicle (while the vehicle is proximate to the premises) that additional material is to be provided to the premises, and/or stores information indicating that additional material is to be provided. In some embodiments, the vehicle may hold a reservoir of the material such that the vehicle provides the material to the premises when the condition is met. In such embodiments, the system may instruct the operator while the vehicle is proximate to the premises that additional material is to be provided. Following the instruction, the operator may provide the material to the tank to refill the tank in part or in whole. In some embodiments, therefore, the vehicle may be disposed proximate to the premises from a time when the value indicative of the material level is received, through the system making a determination of whether additional material is to be provided to the tank, and through the additional material being provided to the tank. This may be advantageous in some embodiments as the vehicle may not have to visit the premises twice, once to receive the fuel level and again to provide the additional material.

Accordingly, in some embodiments, the system may provide for a dynamic determination to be made of whether to refill a tank of a premises with a material, while a vehicle having a reservoir of the material is proximate to the premises. In some embodiments in which communications between components of the system are performed wirelessly, the system may make the determination while the vehicle is driving by the premises along a route to different premises, and may permit a determination to be made without the vehicle stopping or slowing for the determination. This may advantageously enable the vehicle to stop only if a determination to provide additional material is made, and thus enable the vehicle to continue without stopping (or, in some embodiments, without slowing) if a determination is made that additional material should not be provided.

The inventors have recognized and appreciated various disadvantages of existing systems for monitoring fuel tank levels for residences. Existing systems transmit fuel level information remote from the residence using an existing Internet connection of the residence or using a wireless wide area network (WWAN) connection, such as a cellular network connection. The destination of these transmissions are monitoring services that track the fuel tank levels and make remote determinations of whether to send a vehicle to the premises specifically to refuel the tank. The inventors have recognized and appreciated that these systems are disadvantageous because they are not technically or economically feasible in some circumstances. For example, some residences do not have existing Internet connections, or may be part-time residences that do not have Internet connections during some months that the fuel tank should be monitored (e.g., a summer home may not have an Internet connection during winter months when the fuel tank is needed for heating the home). As another example, some residences may be disposed at, or some fuel tanks may be disposed within premises (e.g., in basements) at, locations where a WWAN connection cannot be reliably made. These technical limitations prevent these existing systems from being used in some scenarios. There are additional economic limitations, in that the systems that use Internet connections or WWAN combined with remote monitoring have ongoing infrastructure costs that increase the expense of operating such systems. Operators of these systems typically recoup these costs through annual fees that are charged directly to the residence owner or to a fuel delivery company that must absorb or pass on those fees.

The inventors have recognized and appreciated the advantages of systems that, rather than relying on existing Internet connections or long-range wireless connections to specialized remote monitors, operate in a localized area specific to a premises being monitored. For example, a short-to-mid range wireless transmission having a range similar to dimensions of the residence, or up to 1 mile, may enable transmission to a vehicle proximate to the residence that is adapted to evaluate the tank level information and make a determination of whether additional material should be supplied to the tank. The determination may be made in the vehicle while the vehicle is traveling between different premises on a route that the vehicle would follow to make deliveries, such as routes that vehicles make when monitoring systems are not used. The determination may be made while the vehicle is moving proximate to the premises, while traveling on the route, such that the vehicle may not need to stop or slow based on the determination. The vehicle may, in some embodiments, additionally be adapted to provide the material to the tank. In this way, existing equipment for making deliveries of material to premises may be used to perform monitoring, rather than specialized, remotely-located equipment. Such a system that uses existing equipment in a substantially similar manner as the equipment was already being used (e.g., existing vehicles traveling between premises, as the vehicles were previously used) may reduce costs as compared to prior solutions, in addition to overcoming the technical limitations discussed above.

Examples of a system for monitoring levels of a material in tanks at premises, and in some cases making determinations proximate to the premises of whether to supply additional material, are discussed in detail below with respect to FIGS. 1-6. In the examples below, the material in the tanks is fuel. The fuel may be heating oil, propane, diesel, or any other type of fuel, including any suitable type of liquid fuel that may be used at a residential or commercial building. It should be appreciated that embodiments are not limited to operating with any particular type of fuel. It should be further appreciated that embodiments are not limited to operating with a material that is fuel, and instead may operate with any material that is stored in a tank at a premises for use at that premises, including use by utilities equipment at the premises that provides utilities services to the premises. Utilities services may include electricity services, heating services, water services (including supplying potable water from a tank, filtering water, heating water, cooling water, providing irrigation), and/or sewage/septic services. Embodiments may be used with any material that may be stored in a tank for such utilities services, such as any material that may be consumed by utilities equipment at a premises. For example, in some embodiments, potable water tanks at premises may be monitored using techniques described herein.

FIG. 1 illustrates an example monitoring and delivery system 100 with which some embodiments may operate. System 100 includes a premises 102 that includes a fuel tank 104 to hold fuel (e.g., heating oil, propane, etc.) to be supplied to utilities equipment at the premises to provide, for example, heat and hot water to the premises. Premises 102 is illustrated in FIG. 1 as a residence but may be any suitable residential and/or commercial building or other building that includes a fuel tank 104 to supply fuel to utilities equipment at the premises. For ease of illustration, premises 102 is illustrated with one tank, but those skilled in the art will understand that multiple tanks may be included at a premises.

FIG. 1 additionally shows components of a monitoring and delivery system 100 that are disposed at the premises 102, including a tank monitor 106 and a relay 108. While monitor 106 and relay 108 are described and illustrated as separate devices, it should be appreciated (as discussed in more detail below) that in some embodiments some or all of the components and/or functionality of monitor 106 and relay 108 may be arranged in a single integrated device, such that the integrated device may monitor a fuel tank and communicate directly to a receiver proximate to the premises 102 without communicating via a separate device (e.g., a relay 108).

Tank monitor 106 may be adapted to determine a level of fuel in the fuel tank 104. The "level" of fuel in the tank 104 may be any suitable value indicative of an amount of fuel in the tank, such as a value indicating a volume of fuel in the tank, a current height of the fuel in the tank, or other value. In some embodiments, the monitor 106 may be an ultrasonic monitor that is attached to an exterior of the tank 104 and uses ultrasound waves to detect a level of fuel in the tank 104. As another example, the monitor 106 may additionally or alternatively be a sliding resistance monitor that includes a float disposed in the tank that floats on top of the fuel and is attached to a resistance sensor such that as the float changes position in the tank (dependent on the amount of fuel in the tank), the resistance detected by the sensor changes. The monitor may additionally or alternatively be a pressure switch monitor that measures a weight of the tank on a transducer, which may vary as the level of fuel in the tank varies. The monitor 106 may additionally or alternatively be a pressure switch monitor that measures the air pressure in a vertically-oriented, air-filled tube that projects down into the tank 104 and extends to the near-bottom of the tank 104, such that the pressure in the tube changes proportionally with the level of the fuel in the tank. The ultrasonic monitor, sliding resistance monitor, and pressure switch monitor are conventionally-available devices that will be understood by those skilled in the art, and as such will not be discussed in detail herein.

The monitor 106 may additionally or alternatively comprise a device that determines the level of material in the tank 104 by determining capacitance of a capacitive sensor in the tank and using the measured capacitance as an indicator of the level of material in the tank. In some embodiments, the capacitive sensor can comprise a probe which includes a pair of equally spaced, isolated conductors within the tank. Each of the isolated conductors in the tank can, for example, comprise a capacitive plate. A capacitive plate may be comprised of conductive materials such as aluminum, tantalum, silver, or other suitable materials, Properties that affect capacitance between the plates include area of each plate, space between the plates, and the dielectric strength of material between the plates. Given that the area of each plate and space between the plates remains substantially unchanged while dielectric strength of the material between the plates changes, the dielectric strength can be used to measure capacitance. In some embodiments, the probe may be immersed in the material in the tank 104. In a fuel tank, depending on the level of fuel, the probe may be immersed either entirely in fuel or in a combination of fuel and air. Therefore, the material between the capacitive plates may comprise either fuel or a combination of fuel and air. In some cases, the dielectric strength of fuel in the tank 104 can be in a range of 10 to 15 mV/m and dielectric strength of air can be approximately 3 mV/m. The dielectric strengths of fuel and air may be sufficiently different that a ratio of fuel and air in the fuel tank can affect the dielectric strength of the material between the capacitive plates, and thus affect capacitance between the plates.

In some embodiments, the monitor 106 may use this relation between the dielectric strength to infer the ratio of fuel and air in the fuel tank and determine a level of fuel in the fuel tank. Since the space between the plates and the area of the plates can be held substantially constant and the dielectric constant of fuel and air are both substantially constant values, changes in the capacitance of the capacitor within the fuel tank are influenced exclusively by the fuel to air ratio. More fuel and less air may result in a higher capacitance whereas less fuel and more air may result in a lower value capacitance. In embodiments where the tanks hold other materials, similar relationships between dielectric strengths of those materials and air may be used. For example, when the tank 104 is full, the capacitance between the conductors can be established entirely by a dielectric strength of the material. If the tank 104 is less than full, the capacitance between the conductors can be established by a dielectric strength based on a combination of material remaining in the tank 104 and air in a void portion of the tank 104.

In one embodiment, the capacitive sensor may include an electrical circuit to measure the capacitance. The electrical circuit can, for example, comprise the conductors (which will be used to measure the capacitance, as described above) and a resistor forming an RC circuit. When this type of circuit is excited with a voltage, it yields a time response that corresponds to a time constant equivalent to a product of resistance of the resistor and capacitance of the capacitor. The resistor may have a known resistance value. The electrical circuit may excite the conductors and resistor, and measure the time constant. The capacitance may then be derived using the known resistance value and the time constant. Different fuel levels result in different capacitance values that result in different time responses from the RC circuit. Exciting the circuit with a voltage and then measuring the time response can provide a time measurement that is proportional with the capacitance C and, consequently, with the fuel oil to air ratio. The time response can be measured using, for example, a microcontroller or other device.

Figure 7:
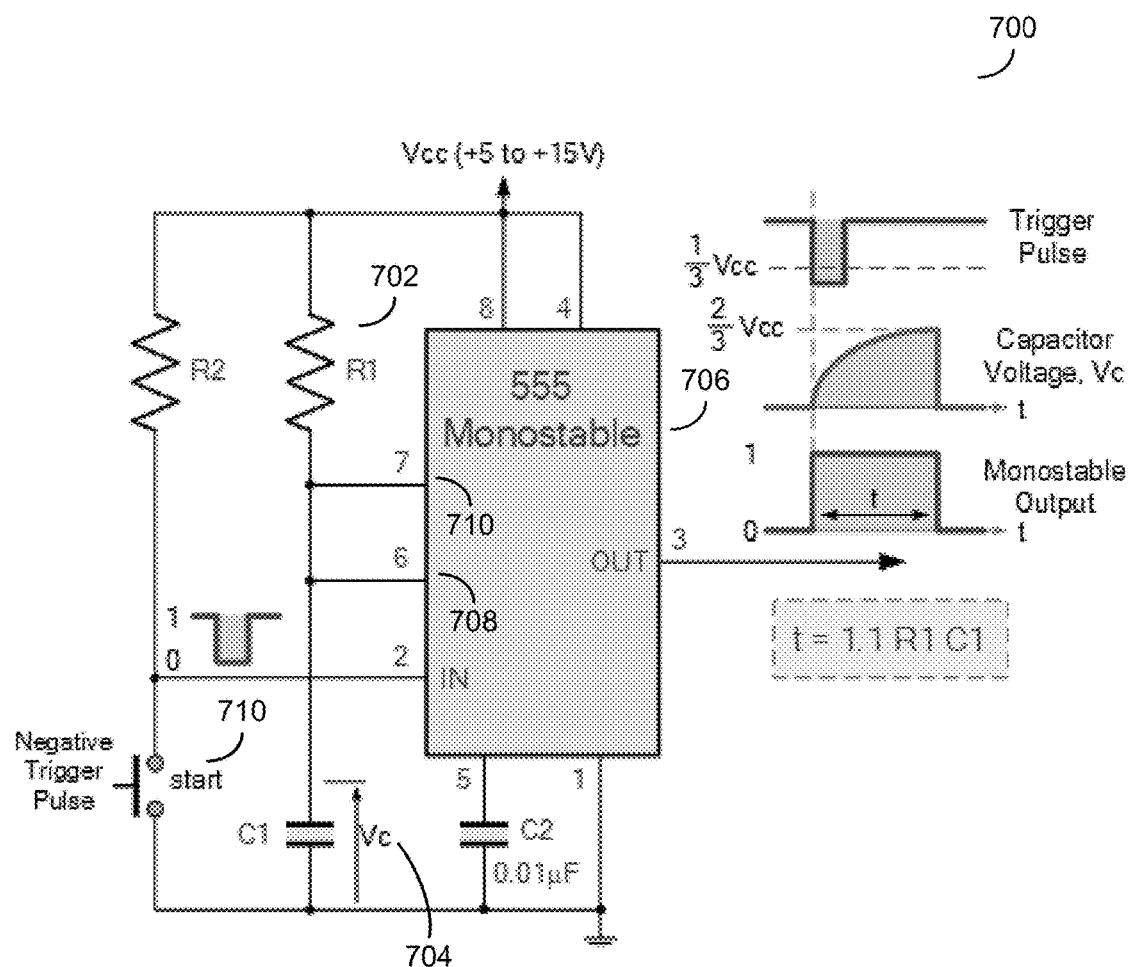
FIG. 7 is a schematic of an electrical circuit that may be used in some embodiments as part of determining a level of a material in a tank.

One example embodiment of the electrical circuit is shown in FIG. 7. The electrical circuit 700 can be formed by connecting the capacitor 704 and a resistor 702 of known resistance value to an NE555 timer chip or other equivalent device. The capacitor can be connected to a threshold input 708 of the NE555 timer chip 706 and the resistor can be connected to the threshold input 708 and a discharge input 710 of the NE555 timer chip 706. The monitor 106 may activate a trigger of the NE555 chip 706 to trigger an excitation signal. The electrical circuit can be used to measure the time constant for the capacitor response to the excitation signal, and the monitor 106 can calculate the capacitance using the known resistance 702 and the measured time response. For example, the monitor 106 can activate the trigger input pulse of the NE555 timer chip to start charging the capacitor 704 through the resistor 702. This in turn activates a monostable output of the NE555 timer chip which remains active for a time, $T_{output}$, that may be equivalent to the following:

$$T_{output} = 1.1 * Resistance * Capacitance$$

By measuring $T_{output}$, the monitor 106 can calculate the capacitance using the known resistance from the formula above.

Circuits used in level measurement applications to determine the capacitance between the plates typically utilize radio frequencies that are altered by the capacitance of the probe. However, these circuits tend to be expensive and require higher power levels than are available in a low power battery operated fuel level sensor. The inventors recognized and appreciated that electrical circuits described in some embodiments herein provide lower cost and low power methods of measuring capacitance.

In some embodiments that measure the capacitance using an electrical circuit as discussed above, the monitor 106 may be calibrated with measurements regarding tank level. In some such cases, the monitor 106 may be calibrated prior to installation, or including calibrated prior to sale or distribution, such as by being calibrated at a factory or vendor. Calibration may include establishing multiple references for capacitance values associated with levels of material in the tank 104. The references can include capacitance values for when the tank 104 is full and when the tank 104 is empty. For example, an RC circuit such as the one described above can be calibrated to establish a time response of the circuit when the tanks is full, $\tau_{full}$, and a time response for when the tank is empty, $\tau_{empty}$. A measured time response, $\tau_m$, can be used to measure a ratio that is a measure of a current fuel or other material height in the tank relative to a maximum fuel height (the maximum corresponding to a full tank) using the following equation:

$$\text{Measured Relative Fuel Height \%} = 1 - \left( \frac{\tau_{full} - \tau_m}{\tau_{full} - \tau_{empty}} \right)$$

This ratio value may further be used to calculate an actual volume of fuel or other material in the tank:

Measured Volume=(Measured Relative Fuel Height %)*(Tank Full Capacity)

This calibration can, for example, be executed for an electrical circuit formed using a NE555 timer chip such as the one described above. In the case of an NE555 circuit, the calibration may comprise measuring a $T_{output}$ for a full tank and an empty tank. The monitor 106 values can then use the calibration values along with a measured response time of the circuit when it is deployed to calculate relative fuel height and volume using the formulas above.

In certain embodiments, the monitor 106 may be further configured with tank characteristics that may be used to determine material level in the tank 104. For example, in some cases, the tank 104 may have uniform horizontal cross-sections. For this type of tank, the physical depth of the tank 104 may be required to determine material level. In other cases, the tank 104 may have non-uniform horizontal cross-sections. For this type of tank, the monitor 106 may use geometry of a region of the tank 104 to determine material level. The calibration may comprise of determining multiple references for tank volumes and associated capacitance values. The references may include volumes and associated capacitance values for when the tank is full and when the tank is empty as described in an example embodiment above. In some embodiments, the monitor 106 may be further calibrated with this information regarding the tank characteristics at installation time, such as when a technician, owner of the premises, or other user is configuring the monitor 106 to monitor the level of fuel in the tank 104. The tank characteristics or other configuration and calibration information may be input via any suitable interface, including an interface integrated into the monitor 106 or an interface connected wired and/or wirelessly to the monitor 106. For example, in some embodiments, the monitor 106 may be configured to wirelessly communicate with a computing device, such as a mobile computing device like a smart phone or tablet computer, during a configuration phase of installation. During such a configuration, tank characteristic, calibration, or other information may be input by a user to the computing device and communicated to the monitor 106.

To determine a level of fuel in the tank 104, the monitor 106 may additionally or alternatively use a sensing device that measures a physical property that is correlated with the quantity of the material consumed over time. In the case of a fuel tank, the monitor 106 may use data indicating fuel consumption in conjunction with one or more time-stamped calibration levels for the tank 104 and subsequent, time-stamped refill indications for the tank 104, to determine the current level of the tank 104 at any time. The time-stamped refill indications may correspond to information received from a device proximate to the premises (e.g., disposed in a vehicle) or input to a user interface of the monitor 106 or another device connected wired and/or wirelessly to the monitor 106, indicating that the tank 104 has been filled to capacity. The time-stamped calibration levels may similarly be input to the monitor 106 via any suitable messages or interface, and may include information indicating an amount of fuel in the tank 104 or a level of the tank 104, as well as sensor readings to be used by the monitor 106.

In such embodiments, to determine the level of material in the tank 104 when the material is fuel, the monitor 106 may measure one or more of the following properties of a furnace, boiler, or other utilities equipment at the premises: the fuel burner motor voltage or current, the fuel burner flame detector, the fuel burner motor or blower vibration, the fuel burner blower air flow, absolute temperature and/or temperature rate of change. Each of these properties can provide an indication of a fuel burner run time. The monitor 106 may use the fuel burner run time in conjunction with knowledge of fuel burner consumption rate to determine an amount of fuel consumed by the fuel burner.

In some such embodiments, the monitor 106 may use temperature to determine fuel burner run time. Absolute temperature and temperature rate of change can be measured at several locations on the burner/furnace system. Temperature rate of change on the exhaust pipe or stack can closely correlate with fuel consumption. It is appreciated that measuring temperature is an inexpensive means of determining fuel burner run time. The monitor 106 can, for example, collect temperature data direction from a temperature sensor using an $I^2C$ interface or by converting analog sensor output to digital data using a microcontroller. Alternative electronic voltage or current monitoring techniques require direct connections to high voltage AC that then require installation by a certified electrician or HVAC technician. Products that have high voltage AC circuits or connections also require product safety testing and certification. All of these requirements adversely affect product and/or installation cost. Temperature sensing may not require special certification of the installer or the product itself.

In one example embodiment, the monitor 106 may measure temperature of an exterior surface of a flue vent of a fuel burner. The flue vent on many fuel burners is easily accessible for sensor installation, has a relatively fast thermal response time, and provides accurate and reliable correlation with the burner run time and fuel consumption. The specific location of the temperature sensor on the flue vent is not critical because of the large temperature differential between the hot exhaust gasses inside the flue vent and the ambient temperature outside the pipe. Further, temperature is substantially uniform across the flue vent. In some embodiments, the flue vent is only a few feet in length and locating the temperature sensor anywhere on its surface is acceptable.

When the fuel burner state changes, the flue vent temperature may change. At start up, for example, the flue vent surface temperature may start to increase within a period of time. The short period of time can be, for example, in a range of 4 to 5 seconds. The flue vent temperature may continue to increase at a decreasing rate of change until the temperature reaches steady state, per the thermodynamic principles. When the burner shuts off, the stack pipe surface temperature may start to decrease within a short period of time. The period of time can be, for example, in a range of 4 to 5 seconds. The flue vent temperature may continue to decrease at a decreasing rate of change until it achieves steady state, per the thermodynamic principles. In some embodiments, the monitor 106 may add a constant heat-up and/or cool down constant value to the measured time during which the stack pipe temperature is changing independent of ambient temperature change to achieve a required burner on-time measurement accuracy. Very short burner run times, such as times less than 4 seconds, are uncommon. For example, a very short burner run time following shut-off of one zone and start-up of another zone, may be prohibited by a hysteresis performed by the fuel burner control unit. Even if very short on or off cycles are possible, burner time on measurement errors from those cases may be negligible. For typical burner consumption rates, each start-up and shut down would represent an error of 0.036 ounces total fuel consumption error and 0.03% per second of consumption rate error.

In some embodiments, the monitor 106 may sample the flue vent temperature frequently enough to detect changes in conditions indicating burner run time. The monitor 106 may sample the temperature at a frequency of at least twice the rate of change of the flue vent surface temperature reaction to burner state changes. For example, the monitor 106 may sample temperature values at a rate of 2 Hz to ensure that changes may be detected for a fuel burner temperature changes that takes 4 or more seconds to be reflected in the temperature of the flue vent surface. The monitor 106 may perform further data processing activities to ensure accurate temperature measurements. The monitor 106 may, for example, average or smooth collected temperature data to filter noise. The monitor 106 may then use processed data to detect changes in temperature to measure burner on time. In one example, the monitor 106 can detect reversal of slope in the temperature data to determine the burner turning on or off. The monitor 106 may then use timestamps of on and off detections to calculate burner run time.

In some embodiments, the monitor 106 may use the burner on time with fuel consumption rate, initial fuel level, and amount of fuel added to determine a fuel level in the fuel tank 104. The fuel consumption rate may, for example, be determined by a burner nozzle size. A larger burner nozzle size may correlate with a higher consumption rate. The fuel consumption rate may also be a constant value associated with a burner type. In one example, the current level in the tank 104 may be calculated over time according to the following formula:

Current Tank Level=Initial Level+Fuel Added−Fuel Consumed where

Fuel Consumed=Burner On Time*Fuel Consumption Rate

Burner on time may be calculated in a manner described in examples above, or using other methods. Other sensors, parts, and combinations thereof may be used to determine a burner on time. Note that any discussion about the flue vent can also refer to a single wall thickness vent pipe, stack, flue pipe, or exhaust pipe of the fuel burner.

It should be appreciated that while examples of monitors have been given, embodiments are not limited to a particular type of monitor that may be used to determine a level of fuel in the tank 104 and any suitable device or equipment for determining a level of fuel in the tank 104 may be used.

In some embodiments, in addition to determining tank level, the monitor 106 may be adapted to collect information on an operating state of utilities equipment at the premises, such as the utilities equipment supplied by the fuel tank 104. The operating state information may indicate whether the utilities equipment is functioning properly or is in need of maintenance/repair. This may be helpful to collect because, in some cases such as summer homes for which fuel is being supplied for winter heating, premises may be unoccupied while the monitoring system is in use and collecting information on operating state may aid in preventing or mitigating an emergency at the premises.

The type of information that indicates an operating state of utilities equipment may vary based on the type of utilities equipment that is monitored. In some embodiments, the monitor 106 may collect this information in the form of environmental information indicating a condition of an environment of the monitor 106. For example, temperature information indicating an ambient air temperature of an area in which the monitor 106 is disposed may be collected. The air temperature may indicate whether heating utilities equipment is properly functioning based on whether the air temperature is below a temperature that would be considered appropriate for the premises (e.g., a temperature near or below freezing), which may be a per-premises value or a default value for all premises. Additionally or alternatively, a level of ambient carbon monoxide may be detected, which may indicate a failure in heating equipment. Additionally or alternatively, humidity information may be collected, which may indicate a failure (e.g., a leak) in water equipment at a premises, where the utilities equipment provides water service. Other environmental conditions for other types of utilities equipment may additionally or alternatively be detected, as embodiments are not limited in this respect.

Additionally or alternatively, in embodiments in which the monitor 106 detects proper functioning of the utilities equipment, the monitor 106 may detect equipment-specific information, which may be provided by the equipment or by a device adapted to monitor specific equipment. For example, the monitor 106 may determine whether a burner lockout condition has occurred on heating equipment such as a furnace. The monitor 106 may receive the information on the burner lockout by being communicatively connected to the utilities equipment to detect the burner lockout, or otherwise being adapted to receive the information from the utilities equipment. In some embodiments in which a burner lockout is detected, monitor 106 may include a physically separate component to interface with utilities equipment and receive information on burner lockout conditions, and wireless transmit to another component of the monitor 106 information indicating that a burner lockout has occurred.

The monitor 106 includes a wireless transmitter (or wireless transceiver, or other wireless communication circuit) to transmit the fuel tank level information and (in embodiments in which it is collected) utilities equipment operating state information from the monitor 106. In the example of FIG. 1, the monitor 106 transmits the information to a wireless relay 108 that receives and stores the information to be transmitted outside the premises 102. The monitor 106 may transmit the data to the relay 108 upon occurrence of a condition, and the relay 108 may continuously, periodically, or occasionally (e.g., upon satisfaction of a condition) transmit the most-recently-received data from the premises to be received by a receiver (e.g., in a vehicle) when a receiver is positioned proximate to the premises 102. Details of how the monitor 106 and relay 108 may communicate in embodiments are described below with respect to FIGS. 3A-4B.

In the example of FIG. 1, the monitor 106 and relay 108 are physically separate devices. This may be advantageous in embodiments in which the tank 104 being monitored is a fuel tank, due to safety restrictions regarding fuel tanks and operating powers of devices disposed near fuel tanks. Specifically, in some embodiments the relay 108 may be a device with relatively high power requirements, because in these embodiments the relay 108 may transmit data at a high frequency (i.e., often) away from the premises to a receiver (e.g., a vehicle) disposed proximate to the premises. Because many transmissions may be sent, and depending on power requirements of the protocol used for the transmission, powering the transmission of the data to a vehicle disposed proximate to the premises may require a large power reserve. The large power reserve may be provided by grid power or by a battery that may be relatively high capacity to reduce or avoid undesirable frequent battery changes. Positioning a device powered by grid power or a large-capacity battery near a fuel tank may be a fire/explosion risk and may be prohibited by building codes in some cases. To overcome these safety restrictions, in some such embodiments a physically separate monitor 106 and relay 108 are provided. The monitor 106 may transmit less frequently than the relay 108 (e.g., only on occurrence of a condition) and transmit only a short distance to the relay 108, within the premises 102. Accordingly, in these embodiments, the monitor 106 may not require a large amount of power, and a lower-capacity battery may be used than would be required if the relay 108 were incorporated with the monitor 106. This lower-capacity battery may not raise safety concerns regarding the fuel tank.

Accordingly, in some embodiments and as shown in FIG. 1, the system 100 may include a monitor 106 that collects fuel tank information (and, in some cases, utilities equipment operating state information) and transmits it to a relay 108. The relay 108 may then transmit the information outside the premises to a receiver proximate to the premises.

However, in embodiments in which fuel tank concerns may be mitigated in some manner, such as through lower-power communications or less frequent communications, the system 100 may not include separate devices for monitor 106 and relay 108. Instead, a single integrated device including some or all of the fuel tank monitoring components and/or functionality the monitor 106 may include some or all of the communication components and/or functionality of relay 108, and may monitor a fuel tank and communicate tank level information directly to a receiver disposed proximate to the premises. Thus, in some embodiments, some or all components and/or functionality discussed herein of both the monitor 106 and relay 108 may be integrated into the same device, with these components integrated, for example, in the same housing. The components may include sensing components of the monitor 106 and communication components of the relay 108. In some embodiments, these components of the monitor 106 and relay 108, when disposed in the same integrated device, may be in electrical communication with each other. For example, a hardwired circuit may be used to electrically connect components of the monitor 106 to components of the relay 108 within the integrated device. In some cases of a hardwired circuit, the components may be connected via a printed circuit board (PCB), and a communication protocol such as SPI or I$^2$C may be used for communication between the components. In some such cases of an integrated device, as discussed above with respect to monitor 106, sensing components of the integrated device may be configured to collect information on an operating state of utilities equipment at the premises, in addition to or as an alternative to sensing a tank 104 directly. In some embodiments that include an integrated device, the device may be configured to use power levels sufficiently low to mitigate or eliminate safety concerns mentioned above. Power levels that are low enough to overcome safety concerns may be determined according to local safety regulations or other standards. The power may be provided from one or more batteries and/or by grid power, and in some cases may be supplied by the grid via a power transformer to convert a high power from the grid into a lower power value that addresses safety concerns.

Embodiments are described herein in which a system 100 includes a monitor 106 and a relay 108 as physically separate devices. It should be appreciated that, unless stated otherwise, functionality described herein as performed by either monitor 106 or relay 108 may be implemented by an integrated device in some embodiments, including by being performed by components included in an integrated device that are described herein as implemented in either monitor 106 or relay 108.

In the example of FIG. 1 that includes different devices, the monitor 106 and relay 108 may communicate using a communication protocol that has a range similar to or less than dimensions of standard residential premises, such as a range less than 300 feet, or a range less than 150 feet, or a range less than 75 feet. As used herein, a "short range" protocol is a protocol having such a range less than 300 feet, or less than 150 feet, or less than 75 feet, as opposed to a "long range" protocol such as a Wireless Wide Area Network (WWAN) protocol or a Wireless Municipal Area Network (WMAN) protocol that have ranges greater than 300 feet. Short range protocols that may be used in embodiments include Wireless Local Area Network (WLAN) protocols and Wireless Personal Area Network (WPAN) protocols, including IEEE 802.11, Bluetooth®, and ZigBee® protocols. In some embodiments, the monitor 106 and relay 108 may communicate using a different protocol, such as one having a shorter range, than the relay 108 uses to communicate with a receiver disposed adjacent to the premises. For example, in some embodiments the monitor 106 may communicate to the relay 108 using a WPAN protocol such as ZigBee and the relay 108 may communicate to the receiver using a WLAN protocol such as IEEE 802.11. In other embodiments, however, the same protocol may be used. For example, in some embodiments, a ZigBee® protocol may be used for communications by the monitor 106 and relay 108. In embodiments that include an integrated device, the integrated device may communicate using a WLAN protocol such as IEEE 802.11. Embodiments are not limited to operating with any particular protocol or type of protocol.

While wireless transmissions have been described between the monitor 106 and relay 108, it should be appreciated that in some embodiments wired communication could be used. Further, while the monitor 106 was described as collecting utilities equipment operating state information and transmitting it to the relay 108, in some embodiments in which utilities equipment operating state information is collected, the relay 108 may collect the state information itself or from another device, separate from the monitor 106, that is adapted to collect the state information.

Examples of components of the system 110 disposed at the premises 102 have been described. As illustrated in FIG. 1, in some cases there may be multiple premises, such as premises co-located in an area or along a route being serviced by a fuel delivery company or other provider of material. Each of the other premises 102B, 102C, etc. may be arranged similarly to the manner shown and discussed above with respect to premises 102. As should be appreciated from the discussion above and below, in some embodiments a receiver in a vehicle may travel between the premises 102, premises 102B, premises 102C, etc. along a route to receive and evaluate fuel tank level information (and other information, in some embodiments). In some embodiments, the vehicle may also be configured to evaluate fuel tank level information and to determine, when proximate to a premises, whether fuel is to be provided to that premises. It should be appreciated, however, that embodiments are not limited to making a determination of whether to provide fuel while proximate to the premises.

Thus, the relay 108 may transmit the fuel tank level information and/or the utilities equipment operating state information from the premises 102 to a receiver 110 disposed proximate to the premises 102. As should be appreciated from the foregoing, where the premises has an existing communication network, such as a WLAN for the premises, or where the premises is accessible via a WWAN the extends over the premises, the existing communication network may not be used to transmit the fuel tank level information and/or utilities equipment operating state information. In some embodiments, the information may be transmitted via an ad hoc network formed by the relay 108 and the receiver 110 while the receiver 110 is proximate to the premises.

In some embodiments, the information may be transmitted by the relay 108 along with information identifying the premises 102, such as address information, owner identification information, account information, an identifier for the relay 108, and/or other information. The identifying information may have been stored in the relay 108 when the relay 108 is installed in the premises 102. The fuel tank level information that is transmitted may be in a similar form as it is produced by and/or received from the monitor 106, or may be processed by the relay 108 and be in a different form that is indicative of a fuel tank level. For example, in a case that premises 102 includes multiple tanks 104 for which a monitor 106 transmits data to relay 108, the fuel tank level information for each tank may be transmitted to the receiver 110, such as with an identifier for each tank. Alternatively, the relay 108 may determine, from tank level information received for multiple tanks from multiple monitors 106, a fill level relative to total capacity and transmit that value.

As used herein, "proximate" to the premises 102 includes within range of the communication protocol by which the relay 108 transmits the data. In embodiments in which a short range protocol is used that has a range within 300 feet or within 150 feet or within 75 feet, "proximate" to the premises may include being within the 300 feet or within the 150 feet or within the 75 feet. In embodiments in which a mid-range protocol is used that has a range within 1 to 2 miles, "proximate" to the premises may include being within the 1 to 2 miles.

In some embodiments, the relay 108 device may transmit the fuel tank information together with utilities equipment operating state information, from the premises 102 to a receiver 110 disposed proximate to the premises 102.

In the example of FIG. 1, the receiver 110 is a fuel delivery truck that includes a fuel reservoir and equipment, including valves, pumps, hoses, etc., to transfer fuel from the reservoir to the fuel tank. The receiver 110 may additionally include at least one computing device 112 to receive the data from the relay 108 and evaluate the received data. As mentioned above, in some embodiments the computing device 112 may determine whether fuel should be delivered to the fuel tank 104 while the receiver 110 is proximate to the premises 102. Specifically, the computing device 112 may execute a refuel determination facility that receives and evaluates the information and outputs an instruction to an operator of the vehicle 110 to deliver or not deliver fuel to the tank 104. The evaluation performed by the facility may include information specific to the premises 102. Examples of ways in which the evaluation may be conducted are described below in connection with FIG. 5.

The refuel determination facility executing on the computing device 112 may in some embodiments communicate with a computing device 114, as part of or as an alternative to evaluating the fuel tank information locally as part of making a decision of whether to refuel. In some cases, the device 112 may communicate with the device 114 before the vehicle 110 travels a route to one or more premises to receive information about each of the premises. Examples of such information are discussed below with respect to FIG. 5. Additionally or alternatively, the device 112 may communicate with the device 114 to inform the device 114 when a delivery is made to a premises 102, and/or an amount of fuel (or other material) delivered to the premises 102. In some embodiments, the device 114 or an operator of the device 114 may adjust a scheduled route of the vehicle 110 if many deliveries are made and a fuel reservoir of the vehicle 110 may be running low, or if very few or no deliveries are made along an initial portion of a route and a determination is made by the device 114 or operator that it is likely that no more deliveries will be made (e.g., if weather has been warm recently, and an initial portion of route confirms that little fuel has been consumed by premises since a last evaluation, the route may be prematurely ended).

Additionally or alternatively, in some embodiments, the device 112 may not include any customer data or other information that may be used to evaluate received data from relay 108. Such other information may be important, for example, in determining whether a fuel level of a tank 104 at a particular premises 102 is below a refueling threshold specific to that premises 102. In such a case, the relay 108 may transmit an identifier for the relay 108 and/or monitor 106. The computing device 112 may send the received data, including the identifier(s), to the remote computing device 114. The computing device 114 may use the identifier(s) to determine the premises to which the received information corresponds. In addition, where fuel tank information received from the relay 108 includes sensor values or other information indicative of a fuel level, rather than a fuel level, the computing device 114 may process received fuel tank information to determine a fuel level in the tank 104. The computing device 104 may further make a determination of whether fuel should be delivered to the fuel tank 104, which may be done in the manner described below in connection with FIG. 5.

Upon determination by the remote computing device 114 to make a fuel delivery to the fuel tank 104, that determination may be sent from the remote computing device 114 to the vehicle-based computing device 112 to inform the vehicle operator. Though, it should be appreciated that in some embodiments, a determination may not be made of whether to refuel a tank 104, while the vehicle is proximate to the premises 102. In such other embodiments, the device 114 may store fuel tank information for use in scheduling a refueling of the tank 104, such as confirming or adjusting a scheduled refueling of the tank 104 at some point in the future. For example, if the device 114 determines based on tank levels determined over a period of time that the premises 102 are consuming fuel at a lower rate than predicted, the device 114 may schedule a refueling to be at a later date/time than otherwise.

In some embodiments in which the device 112 receives utilities equipment operating state information from the relay 108, the device 112 may also communicate the utilities equipment operating state information to the device 114. In such a case, if an error or potential error in utilities equipment is indicated by the information, or an analysis of the information reveals that there may be an error, the device 114 may notify an administrator of the fuel tank monitoring system of any detected error. The notification may be made by displaying a message via a user interface, and/or by sending a text (SMS) message and/or email or placing a phone call to an administrator of the system and/or to a user associated with the premises (e.g., an owner of the premises or a property manager for the premises). In the case of a phone call, a text-to-speech message may be relayed or a previously-recorded message may be played back over the phone call. The message may include any suitable content relating to the operating state of the utilities equipment.

Operations performed by the device 114 may be performed by any suitable software facility (or facilities) executing on the device 114.

The computing device 114 may include a data store 114A of information, such as information on each of the premises that are to be evaluated. Examples of ways in which this information may be used are described below in connection with FIG. 5.

While in the example of FIG. 1, the vehicle 110 includes a fuel reservoir and is adapted to perform deliveries, embodiments are not so limited. For example, in some embodiments, a receiver 110 may be a receiver that is not able to deliver fuel but instead may be a small car (potentially more fuel-efficient than a fuel tanker) that drives a route to identify which premises should be refilled by a fuel tanker, and the fuel tanker may subsequently visit each of the identified premises. In such embodiments, the refuel determination facility may store information identifying each of the premises for which fuel deliveries should be made, such as by storing the information locally on the device 112 and/or by communicating to the device 114.

While the example of FIG. 1 described the relay 108 communicating, in some embodiments, utilities equipment operating state information to the device 112 in the vehicle 110 for evaluation by the refuel determination facility executing on the device 112 (as discussed in greater detail below) and/or on the device 114, it should be appreciated that embodiments are not limited to evaluating the utilities equipment operating state information only on the device 112. In some embodiments, for example, the monitor 106 may be additionally or alternatively configured to perform the analysis described herein of the utilities equipment operating state information to determine whether the utilities equipment is in an improper state, such as malfunctioning. In some such embodiments, if the monitor 106 determines from the evaluation that the utilities equipment is in an improper state, the relay 108 may transmit a notification of the improper state. For example, the relay 108 may include a short-range wireless communication circuit to transmit to receivers (e.g., device 112) proximate to the premises, and may additionally include a long-range wireless communication circuit to transmit, such as via a WWAN (e.g., cellular network) or WMAN, to receivers remote from the premises a notification of the improper state. For example, in response to determining the improper state, the relay 108 may transmit via the long-range wireless communication circuit a notification of the improper state and/or a potential emergency at the premises. The relay 108 may additionally transmit a notification of the improper state along with fuel tank level information and other information, as described herein.

Figure 2:
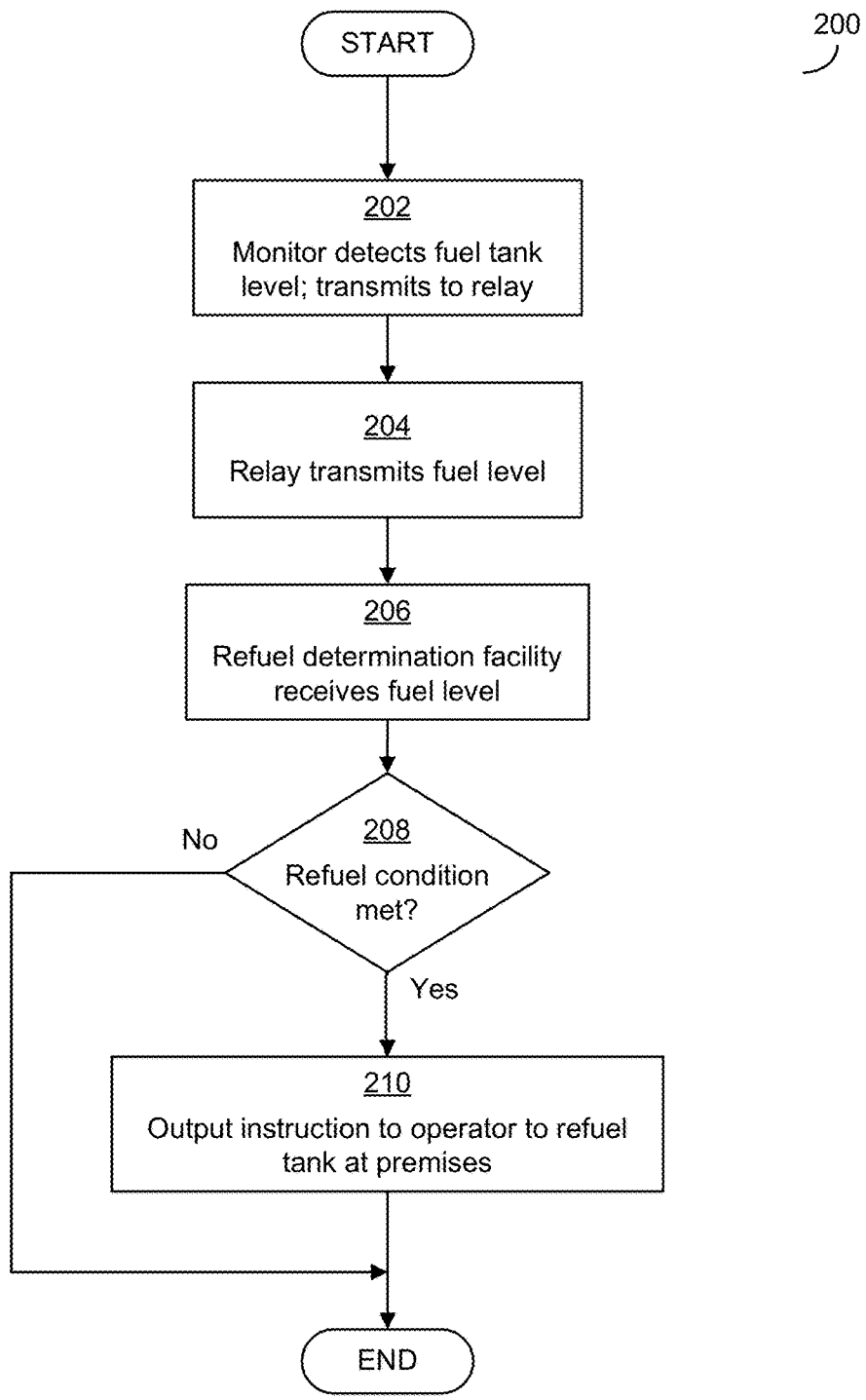
FIG. 2 is a flowchart of an illustrative process for dynamically determining, at a premises, whether to provide fuel to a fuel tank of the premises.

Examples of operations of and communications between components of the system 100 have been described above. For ease of understanding, FIG. 2 illustrates a flowchart of a process 200 that may be implemented by a system 100 to monitor fuel tank levels and make a dynamic determination, at a premises, of whether a fuel tank at the premises is to be refilled. In addition, FIGS. 3A-5 illustrate in more detail examples of operations that may be performed by components of the system 100. It should be appreciated, however, that embodiments are not limited to operating as described below with respect to any of FIGS. 2-5, as other embodiments are possible.

The process 200 of FIG. 2 begins in block 202, in which a monitor attached to a fuel tank detects a level of fuel in the tank and transmits the fuel tank level to a relay. As discussed briefly above and in further detail below, the monitor may detect and transmit the fuel tank level upon satisfaction of a condition. In block 204, the relay device transmits the fuel tank level information and information identifying the premises continuously, or at regular intervals of short duration (e.g., every 1 second, every 10 seconds, etc.). The fuel tank level information may include information on the level of fuel in the tank and any other suitable information on the tank or the fuel, such as a type of the fuel in the tank and/or a capacity of the tank. Examples of information identifying a premises are described above. The relay may transmit the fuel tank level information and identifying information outside the premises, using a protocol having a range to reach a vehicle disposed proximate to the premises. In embodiments in which utilities equipment operating state information is detected by the monitor and transmitted in block 202, the relay may also transmit the state information in block 204.

In block 206, a refuel determination facility executing on a computing device disposed in a vehicle, and/or executing in whole or in part on a remote computing device, receives the fuel tank level information. In some embodiments, the fuel tank level information may be received together with premises identifying information. In block 208, the refuel determination facility evaluates the fuel tank level information to determine whether a refuel condition is met. The refuel condition may be unique to the premises, and may be identified based on the premises identifying information received along with the fuel tank level information. If the refuel determination facility determines in block 208 that the refuel condition is not met, then the process 200 ends. If, however, the refuel determination facility determines that the condition is met, the facility outputs an instruction to an operator of the vehicle to refuel the tank at the premises. Examples of ways in which the operations of blocks 206-210 may be performed are described in greater detail below with respect to FIG. 5. After the instruction is output, the process 200 ends.

The process 200 may be repeated for each premises, with the acts of blocks 202, 204 being executed at a premises repeatedly and the acts of blocks 206-210 being executed by a refuel determination facility as the vehicle travels a route between premises.

Figure 3B:
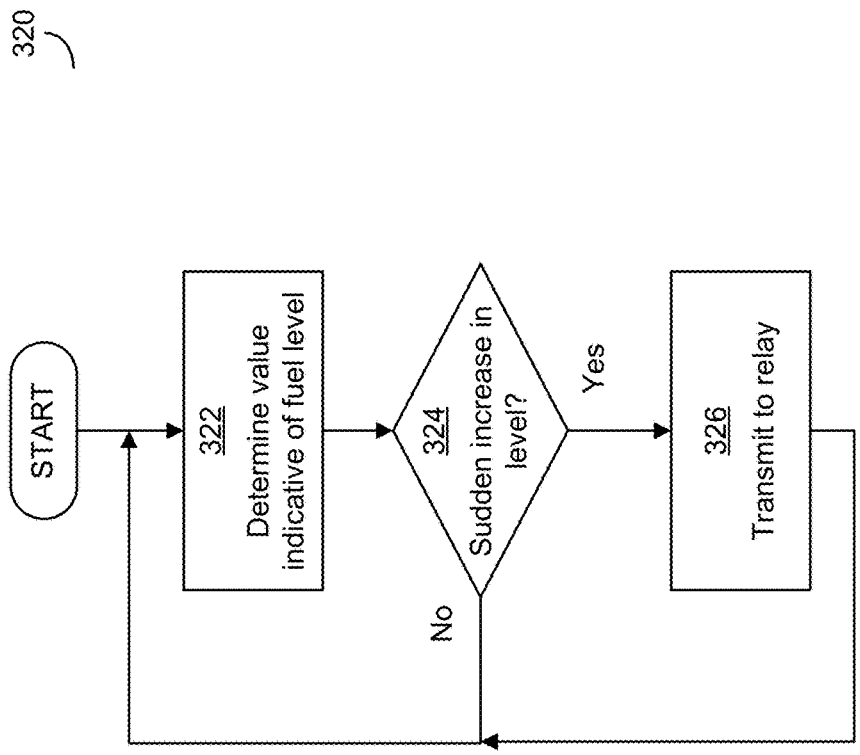
FIGS. 3A and 3B are flowcharts for examples of processes that may be implemented in some embodiments for communications between a fuel tank monitor and a relay device.
Figure 3A:
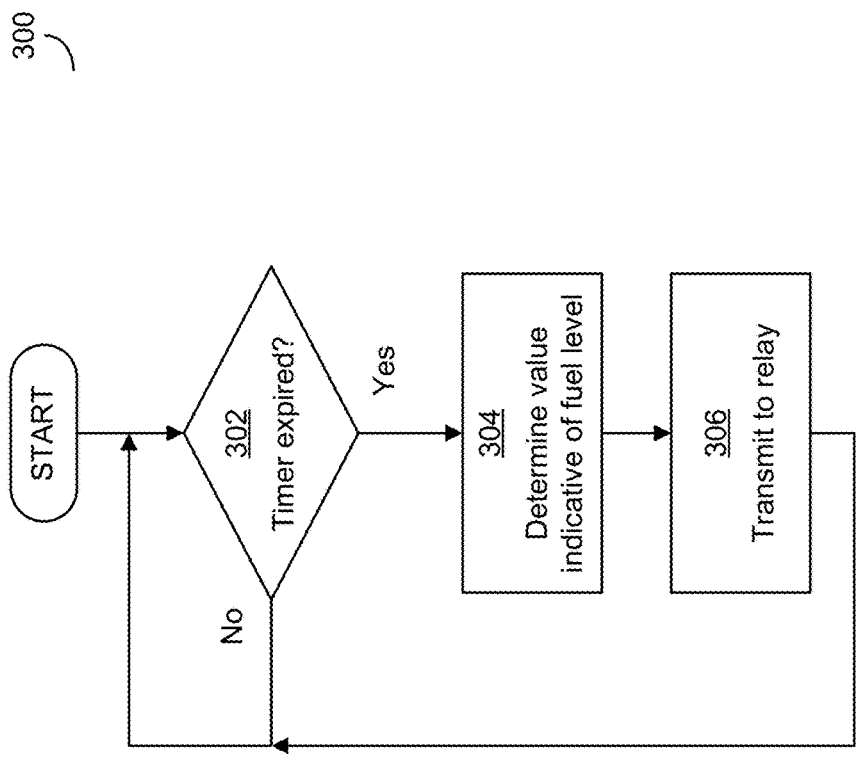

FIGS. 3A and 3B illustrate examples of processes that may be implemented by a tank monitor, such as the monitor 106 of FIG. 1, to determine whether to measure a level of fuel in a tank and whether to communicate the tank level information to a relay. As discussed above, in embodiments that include a relay separate from a monitor, the monitor may communicate with the relay only upon satisfaction of a condition.

In the example of FIG. 3A, the condition is expiration of a time period. The process 300 of FIG. 3A begins in block 302, in which the monitor determines whether a timer has expired. The time period of the timer may be any suitable time period, as embodiments are not limited in this respect. In some embodiments, the time period may be 10 minutes, 30 minutes, 1 hour, 2 hours, 6 hours, 8 hours, 12 hours, or 24 hours, or any suitable value within a range of 1 to 30 minutes, 30 to 60 minutes, or 1 hour to 24 hours. In some advantageous embodiments, the time period may be one hour.

If the timer has not expired, the process 300 stays in a loop, until the timer expires. Once the timer expires, in block 304 the monitor determines a value indicative of the fuel level in the tank, which in some cases may be a value that expressly indicates the amount of fuel in the tank while in other embodiments may be a value that may be processed to determine the amount of fuel in the tank. The manner of determination may vary depending on the type of level determination the monitor is adapted to perform, examples of which are described above. In some embodiments, a value that expressly indicates an amount of fuel in the tank may be determined, such as in some embodiments in which an ultrasonic sensor is used. In other embodiments, such as embodiments that measure a physical property of utilities equipment to determine a value indicative of tank level or other measurement techniques are used, the monitor may produce a voltage value, capacitance value, temperature value or other measurement value that may not itself expressly indicate the tank level, but rather may be indicative of the tank level. That value produced by a sensor of the monitor may be processed by the monitor, the relay, and/or by a computing device outside the premises to produce a value indicative of a level of fuel in the tank. As discussed above, the value indicative of the level of fuel in the tank may be a value indicating an amount of fuel in the tank, such as indicating a volume of fuel in the tank. In some embodiments, the monitor may be configured with a total volume of the tank, which the monitor may use in processing the voltage value or other measurement value to produce the volume value indicative of the remaining fuel. Those skilled in the art will understand how to configure a tank monitor to produce a volume value from a measurement value.

In block 306, once the value indicative of the fuel level is determined in block 304, the value indicative of the fuel level is transmitted to the relay. Any suitable transmission technique may be used, as embodiments are not limited in this respect. For example, in some embodiments a stateful communication may be used in which a connection is established between the monitor and the relay, and in which the relay acknowledges when the fuel tank level is properly received. In such a case, if the relay does not acknowledge proper receipt, the monitor may continue transmission until the fuel tank level is properly received or a determination is made (e.g., after a number of retransmissions) that there is error preventing proper communication. In other embodiments, a best-effort, stateless communication protocol may be used in which the data is transmitted by the monitor without determining whether the relay properly received the fuel tank level information.

In some advantageous embodiments, the monitor may transmit the fuel tank level information to the relay using a ZigBee® protocol. It should be appreciated, however, that embodiments are not limited to using ZigBee®.

Once the fuel tank level information is transmitted in block 304, the process 300 returns to block 302 to determine when, following the transmission, the time period has expired again. In this way, the fuel tank level is detected and transmitted regularly, upon repeated expirations of the time period.

In the example of FIG. 3B, the condition is a significant change in fuel level in a tank (or a significant change in the value detected by the monitor, in embodiments in which a value merely indicative of, and not expressly indicating, the level of fuel in the tank is determined). This change in fuel level may be an increase in fuel and correspond to filling of the tank with fuel. It may be important in some cases for the relay to be informed immediately if the fuel tank has been refilled. This may be important particularly where the time period of FIG. 3A is also used as a condition and the time period is long (e.g., longer than 1 minute or 5 minutes). For example, if the time period is one hour, then fuel tank level information held by the relay and transmitted to a receiver (e.g., fuel tank delivery truck) may be as much as one hour old. If, during that time, another fuel delivery truck visited the premises and refilled the tank to completely full, a newly-arriving fuel delivery truck may be misinformed about the level of the tank and may attempt to fill the tank again. This may lead to an overfilling of the tank that may result in spills that may be ecologically difficult and concerning, or at least undesirable. Such a mistaken duplication of deliveries may occur due to miscommunication between two trucks for a fuel delivery company, but may more commonly arise due to a mistaken delivery on the part of a fuel delivery company that does not service a premises followed by a delivery by a fuel delivery company that does service the premises.

Accordingly, in the example of FIG. 3B, the process 320 begins with the fuel tank monitor determining a value indicative of the fuel tank level in block 322. The detection may be performed as discussed above in connection with block 304 of FIG. 3A. The fuel tank monitor may detect the fuel tank level continuously, or at an interval (e.g., any of the intervals discussed above in connection with FIG. 3A) in this example. In block 324, by comparing a current fuel tank level (or value) to a prior fuel tank level (or value), such as a level from an immediately-preceding detection or a set of multiple detections, the monitor may determine whether it has observed a sudden increase in fuel level in the tank. The monitor may determine whether there has been a sudden increase by determining whether a rate of change over time is greater than a threshold, or whether a fuel level between successive detections shows an increase in fuel of more than a threshold amount. If not, then the process 320 returns to block 322 to detect the fuel level continuously or at an interval. If, however, the monitor determines in block 324 that there has been a sudden increase, in block 324 the monitor transmits the current fuel level to the relay. The transmission may be performed as discussed above in connection with block 306 of FIG. 3A. Once the fuel tank level is transmitted in block 326, the process 320 returns to block 322 to detect fuel tank level.

While the processes of FIGS. 3A and 3B are illustrated separately, in some embodiments both conditions may be used. For example, the process 320 of FIG. 3B may be used to monitor fuel tank level continuously or at a first time interval and transmit if a sudden increase is detected, but also to transmit the most-recently-detected (or detect again) the fuel tank level upon expiration of a second time interval greater than the first time interval. For example, the monitor may detect the tank level every 5 seconds and transmit if a sudden increase is detected, and also transmit the tank level once per hour.

The relay 108 may be adapted to receive any data transmitted to it from the monitor, and may be operable to receive data at any time. For example, the relay may be configured to continuously listen for communications from the monitor and store the received data. In other embodiments in which the monitor transmits only upon expiration of a certain time interval (e.g., embodiments in accordance with FIG. 3A), the relay may be configured with a similar time interval and may only listen for and receive data from the monitor at the time interval. This may be advantageous in some embodiments as it may decrease power consumption by the relay, but those skilled in the art will understand that a relay that only receives data at certain intervals may not be best if a system for detecting sudden increases in fuel in a tank are to be detected, as discussed above in connection with FIG. 3B.

Figure 4B:
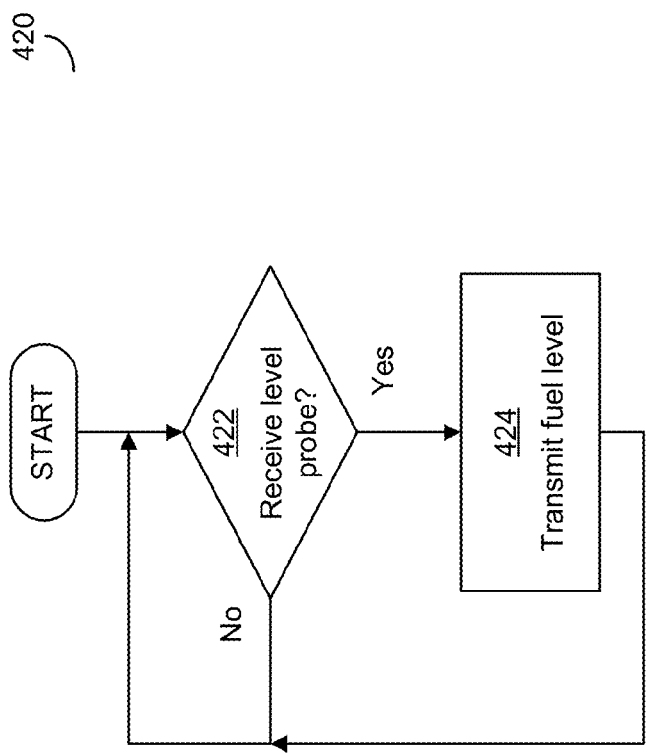
FIGS. 4A and 4B are flowcharts for examples of processes that may be implemented in some embodiments for communications between a relay device and a computing device associated with a vehicle.
Figure 4A:
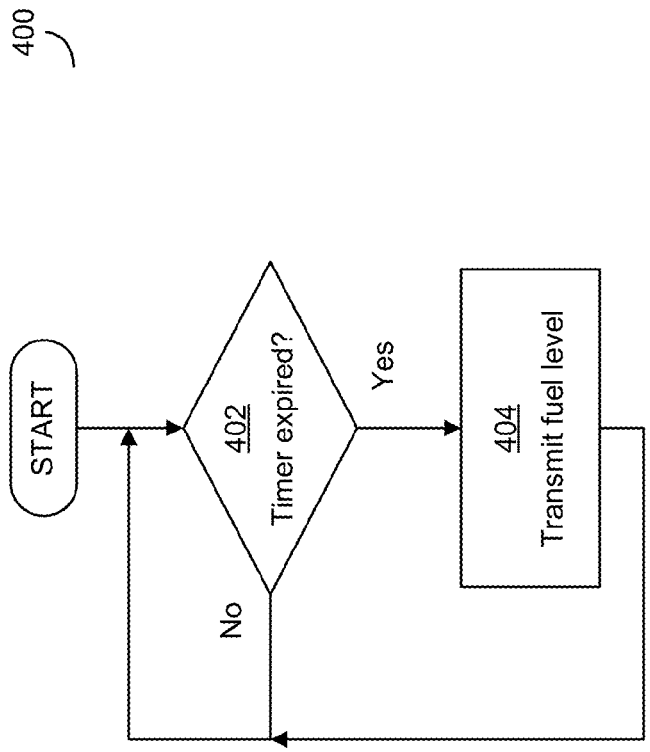

FIGS. 4A and 4B illustrate examples of processes that may be used by the relay to transmit data to a receiver. The data, as discussed above, may include fuel tank level information and identifying information for the premises (and, in embodiments in which it is collected and transmitted, utilities equipment operating state information). The identifying information for the premises may include any suitable information identifying a premises, such as an address for the premises, a name of an owner of a premises, an account number such as for a fuel delivery account associated with the premises, and/or an identifier for the relay and/or monitor (or a component thereof, such as a MAC address for a transmitter of the relay) that may be used to identify the premises based on a relationship between the relay and the premises/account. In some embodiments, though, as discussed above, the relay may only transmit the fuel tank level information (and, in some cases, the utilities equipment operating state information) together with an identifier for the relay and/or monitor. The identifier for the relay and/or monitor may then be used by a receiver to identify the premises, as discussed above.

In some embodiments, the relay may transmit the data continuously or on expiration of a time interval, for receipt by a vehicle that may be driving past. In such embodiments, and where an interval is used, any of the exemplary time intervals discussed above in connection with FIG. 3A may be used. Though, because it may be uncertain in some embodiments when a vehicle may pass by, it may be advantageous to use a brief time interval, such as an interval of 3 or 5 seconds or less, such as one second. FIG. 4A illustrates an example of such an embodiment. The process 400 of FIG. 4A begins in block 402, in which the relay determines whether a time has expired. When the timer has expired (e.g., every 1 second), in block 404 the relay transmits the most recently received fuel data and identifying information. The data may be transmitted in any suitable protocol, as embodiments are not limited in this respect. For example, the data may be transmitted in accordance with an IEEE 802.11 protocol, a ZigBee® protocol, or any other suitable WLAN or WPAN, or short-range, protocol. The message that is transmitted may be a broadcast message that does not specify a recipient, or may include an identifier for a destination/intended recipient with which the relay was preconfigured and with which a receiving device of the vehicle (e.g., device 112 of FIG. 1) will be configured. In some embodiments, a stateful communication may be used in which a connection is established between the relay and the receiver, and in which the receiver acknowledges when the data is properly received. In such a case, if the receiver does not acknowledge proper receipt, the relay may continue transmission until the fuel tank level is properly received or a determination is made (e.g., after a number of retransmissions) that there is error preventing proper communication. In other embodiments, a best-effort, stateless communication protocol may be used in which the data is transmitted by the relay without determining whether the receiver properly received the fuel tank level information. In the example of FIG. 4A, a best-effort, stateless communication may be used together with broadcast transmission, such that a vehicle proximate to the premises at any time may receive (or be likely to receive) the data transmitted by the relay.

Once the data is transmitted in block 404, the process 400 returns to block 400 to monitor the timer and transmit again upon expiration of the timer.

In examples described above, including the example of FIG. 4A, the computing device disposed in the vehicle (e.g., device 112 of FIG. 1) that receives fuel tank level data and other information from the relay is a passive device. In this way, the device merely receives data when it is within range of a premises and a relay disposed at that premises, but does not seek out data from any particular premises. It should be appreciated, however, that embodiments are not limited in this respect. In some embodiments, a device of a vehicle, that is executing a refuel determination facility, may be configured with information on accounts along a route. Using location determination functionality, such as using GPS, Assisted GPS, or another location determination system, the device may monitor a current position of the vehicle. When proximate to a particular premises along the route, the device may request fuel tank level information for the premises by communicating with the relay at the premises. FIG. 4B illustrates an example of a process that may be implemented by a relay in such an embodiment.

The process 420 of FIG. 4B begins in block 422, in which the relay determines whether it has received, from a device of a vehicle, a probe communication requesting tank level information from the premises with which the relay is associated. In some embodiments, the probe communication for the premises may identify the premises with an identifier contained within the probe, which may be any of the examples of premises identifiers described above. When a probe is received, the relay may determine whether it is a probe intended for the premises or intended for another premises by evaluating the identifier and comparing it to stored identifier(s) for the premises. In other embodiments, the probe may be broadcast, asking all recipients that are parts of a fuel tank monitoring system and are customers of the fuel provider with which the vehicle is associated to transmit fuel tank level information.

If no probe is received, then the process returns to block 422 and the relay continues to wait for such a probe communication.

If, however, the relay has received the probe communication, in block 424 the relay retrieves from a data store a fuel tank level most recently received from a monitor and transmits the fuel tank level (and premises identifying information and utilities equipment operating state information, if applicable) to the source of the probe. The transmission may be made in block 424 as discussed above in connection with block 404 of FIG. 4A. Once the data is transmitted, the process 420 returns to block 422 to wait for another probe.

In embodiments like that described in connection with FIG. 4B, in connection with block 422, the relay 108 may periodically or occasionally wake up from a low power, sleep state and "listen" for a signal periodically or occasionally sent by the vehicle-based mobile computing device 112 to determine if a compatible listening device is proximate to the premises. In one example, a device is determined compatible if information is received indicating that the device is an device that forms a part of a fuel tank monitoring system like that described herein. Additionally or alternatively, the relay may determine that a device is compatible if the probe includes an identifier linked to a fuel provider that services the premises (as opposed to a provider having similar equipment but that does not service the premises). The relay may be configured (e.g., upon installation, through input to the relay via a suitable interface, such as via an interface of the relay or via a wired and/or wireless connection to the relay from a mobile device). Upon determining that a compatible receiver is proximate to the premises, it sends the level of the tank 104 and/or other information and receives confirmation of receipt. Following confirmation of receipt, the relay 108 may enter the low power, sleep state, for a first period of time until conditions for sending are again met. If the relay 108 cannot establish that a compatible receiver is proximate to the premises, it enters the low power, sleep state, for a second period of time (which may be the same as or different from, such as shorter than, the first period of time) before again waking from the low power, sleep state and listening for the probe signal sent by the vehicle-based mobile computing device 112. The period (s) of time that the relay remains in the low power, sleep state may be set by a user or administrator.

In examples discussed above, including in connection with FIGS. 3A and 3B, a monitor transmits fuel tank level data (and, in some embodiments, utilities equipment operating state information) to a relay without receiving a request for data from the relay. Rather, the monitor transmits continuously or upon satisfaction of a condition. In some embodiments, such as the embodiment of FIG. 4B, the relay may instead query the monitor for fuel tank level data (and utilities equipment operating state information). For example, in some such embodiments, the relay may receive a probe from the device of the vehicle and, in response, query the monitor for fuel tank level data. In response to receiving the query from the relay, the monitor may detect a current fuel tank level and transmit the fuel tank level to the relay, to be sent to the device of the vehicle in response to the probe.

Figure 5:
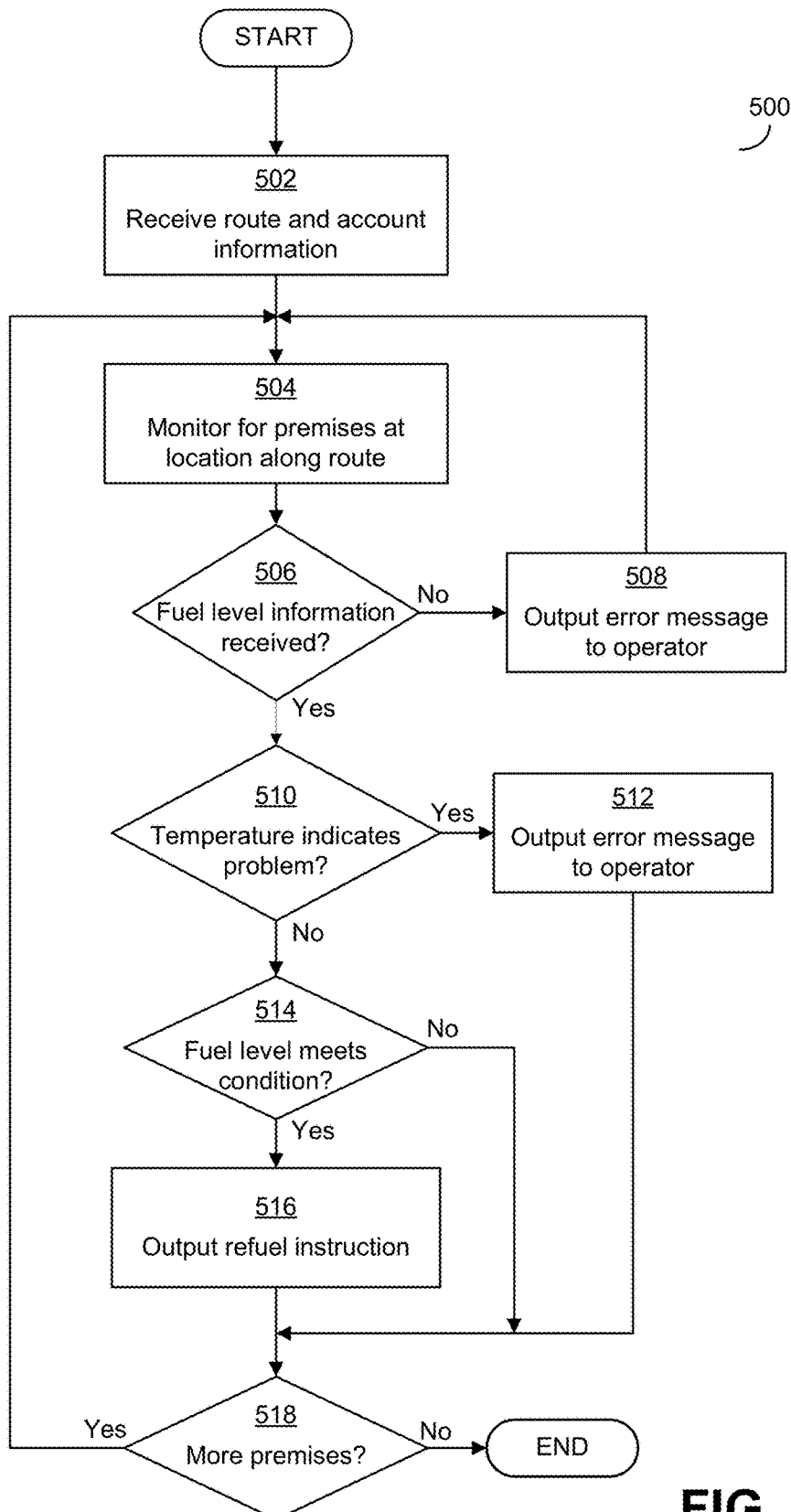
FIG. 5 is a flowchart of an illustrative process that may be implemented in some embodiments for a device associated with a vehicle to evaluate information, received from a premises, relating to a fuel tank and/or utilities equipment at the premises.

As discussed above, upon receipt of tank level and utilities equipment operating state information from the relay for a premises, a refuel determination facility executing on a device associated with a vehicle may make a determination of whether a fuel tank of a premises should be refueled in whole or in part. FIG. 5 illustrates an example of a process 500 that may be performed by a refuel determination facility executing on the device.

The process 500 begins in block 502, prior to a start of a route for the vehicle. In block 502, the refuel determination facility receives route and account information for a route that the vehicle is to follow. The information may be received from another computing device associated with a fuel delivery service, such as device 114 of FIG. 1. The route and account information may identify a route that the vehicle is to follow during a period of time and through an area in which premises that are eligible for fuel deliveries are located. The route and account information may further identify the location of each of the accounts along the route, such as by identifying a street address and/or geographic location (e.g., latitude, longitude, and/or altitude) for each premises that has an account with the fuel delivery service and is eligible for a fuel delivery. The account information may also indicate, unique to each account or for all accounts, a threshold fuel level that will be used to determine whether to provide fuel to a tank. By determining whether a current fuel level of a tank of a premises is less than the threshold fuel level for that premises (or for all premises), a determination can be made of whether to provide fuel to the tank at the premises. In some embodiments, the route and account information may include a set of premises for which refueling is scheduled during the route, which may set the route to be followed. Through the process 500, one or more additional premises to be fueled may be determined. Or, in embodiments in which a refuel determination is not made while the vehicle is proximate to the premises, the vehicle may receive fuel tank level information from other premises along a route between premises for which refueling are scheduled, and the received tank level information may be used to schedule future refuelings for those premises.

Following block 502, the vehicle starts proceeding along the route. In block 504, the refuel determination facility monitors for premises with accounts along the route. The facility may do so by monitoring a current location of the vehicle (e.g., using a location determination functionality) and comparing the current location to locations of accounts identified by the route and account information. When the vehicle is proximate to a premises that has an account with the fuel delivery service, the refuel determination facility monitors for a transmission of fuel tank level information, utilities equipment operating state information, and premises identifying information from a relay of the premises. (Or, in embodiments like the example of FIG. 4B, transmits (by broadcast or with a targeted transmission) a probe to the relay of the premises requesting transmission of the information.)

In block 506, the facility determines whether fuel tank level information was received. The facility may make the determination by monitoring for transmissions from relays and determining whether a transmission from a relay includes premises identifying information for the premises to which the vehicle is proximate.

If no information is received from the relay of a premises, the refuel determination facility in block 508 outputs an error message to an operator of the vehicle, indicating that no information was received and that the vehicle should be positioned proximate to the premises again. The determination that no information was received may be made in any suitable manner. The facility may operate the device on which it is executing to monitor for a transmission while the vehicle is proximate to the premises. The facility may determine that no transmission was received if more than a threshold period of time passes without receipt of a transmission. Additionally or alternatively, if the vehicle continues moving while the facility is monitoring for the transmission, the facility may monitor a current location of the vehicle and determine that no transmission was received when the location indicates that the vehicle is no longer proximate to the premises (e.g., more than a threshold distance away). The error message that is output in block 508 may be output via any suitable user interface, as embodiments are not limited in this respect. For example, a textual message may be output, or a graphical message may be output, a haptic message may be output (e.g., via a vibration of the device), and/or an audible message may be output. The error message may instruct the operator of the vehicle to bring the vehicle back to the premises and, accordingly, after outputting the error message in block 508, the process 500 returns to block 504 to monitor for a transmission from the premises.

If, however, the facility determines in block 506 that fuel tank level information and other information was received for the premises, then the process 500 continues to block 510. In some embodiments, the facility may also output a message indicating successful receipt. The message may be output via any suitable user interface and may be a textual, graphical, haptic, and/or audible message. In block 510, the facility evaluates utilities premises operating state information to determine whether the information is indicative of a problem at the premises. In the example of FIG. 5, the utilities equipment operating state information includes temperature information. The facility may evaluate temperature information in any suitable manner to determine whether the temperature is indicative of an error in utilities equipment (e.g., a malfunctioning furnace or other heating equipment).

For example, the temperature may be compared to a minimum temperature for the premises or for all premises indicated by the route and account information to determine whether the temperature of the premises is below the minimum temperature. If so, the facility may conclude there is a problem and, in response, alert the operator of the vehicle in block 512. Specifically, in block 512, the facility may output a message indicative of the problem at the facility. The message that is output may be a textual, graphical, haptic, and/or audible message. Following output of the message, the process 500 continues to block 518, discussed below.

If it is determined in block 510 that the utilities equipment operating state information does not indicate an error, then the process 500 continues to block 514, in which the facility determines whether the fuel level of the tank as indicated by the information received from the relay for the premises meets some condition for fuel to be delivered. In the example of FIG. 5, the condition is that the fuel tank level is below a minimum level for the premises or for all premises, as indicated by the route and account information discussed above. However, embodiments are not limited to operating with any particular condition for fuel delivery and any suitable condition may be used. If the facility determines based on the information received from the premises that the condition is met, in block 516 the facility outputs a message to an operator of the vehicle that fuel should be delivered to the tank. The message that is output may be textual, graphical, haptic, and/or audible.

If, however, it is determined in block 514 that the fuel tank level information received from the premises does not satisfy the condition, then the process 500 continues to block 518.

In block 518, the refuel determination facility determines whether there are more premises along the route that are to be evaluated. If so, then the process 500 continues to block 504, in which the facility monitors for a next premises. If, however, there are no more premises along the route, the process 500 ends.

Techniques operating according to the principles described herein may be implemented in any suitable manner. Included in the discussion above are a series of flow charts showing the steps and acts of various processes that enable a dynamic determination to be made, at a premises, of whether to supply fuel to a tank of a premises. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 606 of FIG. 6 described below (i.e., as a portion of a computing device 600) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Figure 6:
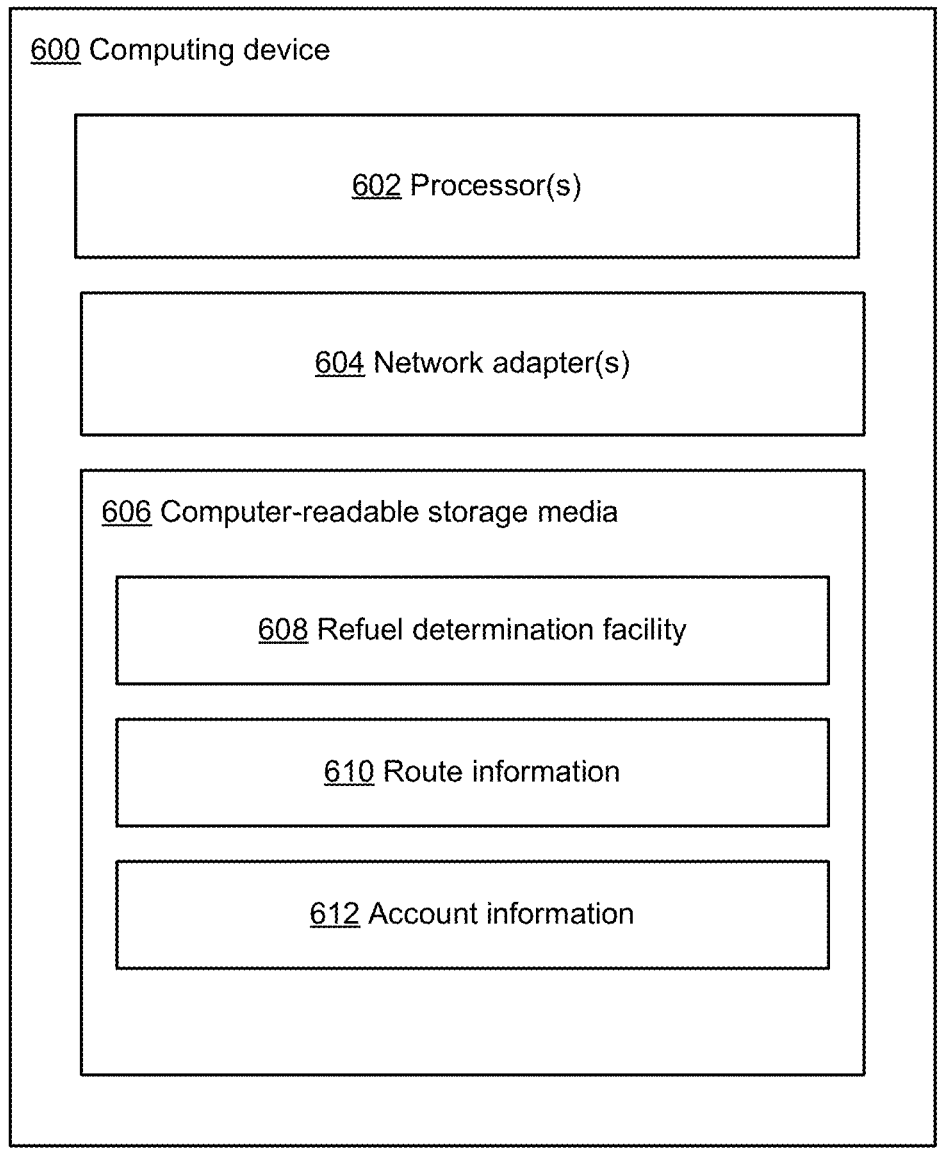
FIG. 6 is a block diagram of a computing device with which some embodiments may operate.

FIG. 6 illustrates one exemplary implementation of a computing device in the form of a computing device 600 that may be used in a system implementing techniques described herein, although others are possible. It should be appreciated that FIG. 6 is intended neither to be a depiction of necessary components for a computing device to operate as a device associated with a vehicle in accordance with the principles described herein, nor a comprehensive depiction.

Computing device 600 may comprise at least one processor 602, a network adapter 604, and computer-readable storage media 606. Computing device 600 may be, for example, a desktop or laptop personal computer, a personal digital assistant (PDA), a smart mobile phone, or any other suitable computing device. Network adapter 604 may be any suitable hardware and/or software to enable the computing device 600 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 606 may be adapted to store data to be processed and/or instructions to be executed by processor 602. Processor 602 enables processing of data and execution of instructions. The data and instructions may be stored on the computer-readable storage media 606 and may, for example, enable communication between components of the computing device 600.

The data and instructions stored on computer-readable storage media 606 may comprise computer-executable instructions implementing techniques which operate according to the principles described herein. In the example of FIG. 6, computer-readable storage media 606 stores computer-executable instructions implementing various facilities and storing various information as described above. Computer-readable storage media 606 may store a refuel determination facility 608, which may implement some of the techniques described above. The storage media 606 may additionally store route information 610, which may identify a route that is to be followed by a vehicle to visit premises that are eligible for refueling. Account information 612 may also be stored by the storage media 606, which may include information identifying premises by location and account number, and identifying any other suitable information about an account such as information to be used in determining whether a refueling condition is met (e.g., a tank level) or whether utilities equipment is properly functioning (e.g., a minimum temperature).

While not illustrated in FIG. 6, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A system comprising:
   a fuel tank monitor comprising:
      at least one circuit to determine a value indicative of a level of fuel in a fuel tank at a premises;
      at least one first wireless communication circuit;
      at least one first processor; and
      at least one first storage medium encoded with first executable instructions that, when executed by the at least one first processor, cause the at least one first processor to perform a first method, the first method comprising:
         operating the at least one circuit to determine the value indicative of the level of fuel in the fuel tank; and
         operating the at least one first wireless communication circuit to wirelessly transmit the value indicative of the level of fuel in the fuel tank;
   a computing device disposed within a vehicle and comprising:
      at least one second wireless communication circuit;
      at least one second processor; and
      at least one second storage medium encoded with second executable instructions that, when executed by the at least one second processor, cause the at least one second processor to perform a second method, the second method comprising:
         when the vehicle is proximate to the premises, operating the second wireless communication circuit to receive the value indicative of the level of fuel;
         determining, while proximate to the premises, whether a condition is met for fuel to be provided to the fuel tank; and
         outputting, based on a result of the determining and via a user interface, an instruction to a user disposed in the vehicle of whether fuel is to be provided to the fuel tank.

2. The system of claim 1, wherein:
   the system further comprises a relay, the relay comprising at least one third wireless communication circuit, at least one third processor, and at least one third storage medium encoded with third executable instructions that, when executed by the at least one third processor, cause the at least one third processor to perform a third method, the relay being a physically separate device from the fuel tank monitor, the relay being disposed at the premises;
   the operating the at least one first communication circuit to transmit the value indicative of the level of fuel in the fuel tank comprises operating the at least one first communication circuit to transmit the value to the relay at expiration of a first time interval; and the third method comprises operating the at least one third wireless communication circuit to transmit from the premises the value indicative of the level of fuel in the fuel tank and an identifier upon expiration of a second time interval.

3. The system of claim 2, wherein:
the at least one first wireless communication circuit is configured to transmit wireless communications with a first range;
the at least one third wireless communication circuit is configured to transmit wireless communications with a second range; and
the second range is greater than the first range.

4. The system of claim 1, wherein the first method comprises operating the at least one first wireless communication circuit to transmit the value indicative of the level of fuel in the fuel tank in response to determining, based on the value, that the fuel level of the tank increased.

5. The system of claim 4, wherein determining that the fuel level of the tank increased comprises determining that the fuel level of the tank increased by more than a threshold amount.

6. The system of claim 1, wherein:
the at least one circuit is further configured to detect information indicative of an operating state of utilities equipment at the premises;
the first method comprises operating the at least one first wireless communication circuit to transmit the information indicative of the operating state of utilities equipment at the premises; and
the second method comprises:
when proximate to the premises, operating the at least one second wireless communication circuit to receive the information indicative of the operating state of the utilities equipment
determining, when proximate to the premises, whether the information indicative of the operating state indicates an improper operating state of the utilities equipment; and
in response to determining that the information indicates an improper operating state, outputting a message indicating the improper operating state.

7. The system of claim 6, wherein:
the information indicative of the operating state of the utilities equipment comprises an ambient temperature within the premises; and
determining whether the information indicates an improper operating state of the utilities equipment comprises determining whether the ambient temperature satisfies a condition indicative of a malfunction of heating equipment of the premises.

8. The system of claim 1, wherein the determining whether the condition is met for fuel to be provided comprises determining whether the level of fuel in the fuel tank is below a minimum fuel level.

9. The system of claim 1, wherein operating the at least one first wireless communication circuit to wirelessly transmit the value indicative of the level of fuel in the fuel tank operating the at least one first wireless communication circuit to wirelessly transmit the value in response to determining that the computing device disposed within the vehicle is disposed proximate to the premises.

10. A method of operating a system for monitoring fuel level of a premises fuel tank and determining whether to provide fuel to the fuel tank of the premises, the method comprising:
when a computing device disposed within a vehicle comprising a fuel reservoir is disposed proximate to the premises, with the computing device:
receiving a wireless transmission, transmitted using a short-range wireless communication protocol, from the premises including a value indicative of a fuel level of the fuel tank of the premises;
evaluating the value indicative of the fuel level to determine whether a condition for refueling is met; and
in response to determining that the condition for refueling is met, outputting an instruction to an operator of the vehicle to provide fuel from the fuel reservoir of the vehicle to the premises fuel tank.

11. The method of claim 10, wherein receiving the wireless transmission including the value indicative of the fuel level comprises receiving an indication of an amount of fuel consumed over a time period.

12. The method of claim 11, wherein receiving the indication of the amount of fuel consumed comprises receiving an indication of an on period for fuel burning utilities equipment at the premises.

13. The method of claim 11, wherein receiving the wireless transmission comprises receiving the wireless transmission in response to a second wireless transmission sent by the computing device disposed within the vehicle, the second wireless transmission comprising a first identifier indicating that the computing device is a component of a tank monitoring system and a second identifier indicating a fuel provider with which the computing device and vehicle are affiliated.

14. At least one computer-readable storage medium having encoded thereon executable instructions that, when executed by at least one processor, cause the at least one processor to carry out a method of operating a system for monitoring fuel level of a premises fuel tank and determining whether to provide fuel to the fuel tank of the premises, the method comprising:
when a computing device disposed within a vehicle comprising a fuel reservoir is disposed proximate to the premises, with the computing device:
receiving a wireless transmission, transmitted using a short-range wireless communication protocol, from the premises including a value indicative of a fuel level of the fuel tank of the premises;
evaluating the value indicative of the fuel level to determine whether a condition for refueling is met; and
in response to determining that the condition for refueling is met, outputting an instruction to an operator of the vehicle to provide fuel from the fuel reservoir of the vehicle to the premises fuel tank.

15. The at least one computer-readable storage medium of claim 14, wherein receiving the wireless transmission including the value indicative of the fuel level comprises receiving an indication of an amount of fuel consumed over a time period.

* * * * *